(12) United States Patent
Ritchey et al.

(10) Patent No.: US 7,108,234 B2
(45) Date of Patent: Sep. 19, 2006

(54) KEYBOARD SUPPORT DEVICE AND METHOD

(76) Inventors: Eugene B. Ritchey, 13821 Sable Blvd., Brighton, CO (US) 80601; Craig E. Ritchey, 14031 Sable Blvd., Brighton, CO (US) 80601

( * ) Notice: Subject to any disclaimer, the term of this patent is extended or adjusted under 35 U.S.C. 154(b) by 23 days.

(21) Appl. No.: 10/819,525

(22) Filed: Apr. 6, 2004

(65) Prior Publication Data

US 2005/0218272 A1    Oct. 6, 2005

(51) Int. Cl.
*B43L 15/00* (2006.01)

(52) U.S. Cl. .................... 248/118.1; 248/918
(58) Field of Classification Search ............ 248/118.1, 248/918, 118, 118.3, 505, 506
See application file for complete search history.

(56) References Cited

U.S. PATENT DOCUMENTS

| | | | | |
|---|---|---|---|---|
| 669,009 | A | | 2/1901 | Ingraham |
| 2,224,530 | A | | 12/1940 | Weinstein ................. 45/80 |
| 2,374,409 | A | | 4/1945 | Brennan ................... 45/80 |
| 2,420,673 | A | * | 5/1947 | Monrad .................... 40/446 |
| 2,701,173 | A | * | 2/1955 | Senior et al. ............. 108/43 |
| 3,300,250 | A | | 1/1967 | Dollgener et al. ....... 297/411 |
| 4,044,980 | A | | 8/1977 | Cummins ................. 248/13 |
| 4,313,112 | A | * | 1/1982 | Foster ..................... 248/639 |
| 4,460,146 | A | | 7/1984 | Raggiotti ................ 248/456 |
| 4,467,727 | A | | 8/1984 | Strommer ................ 108/23 |
| 4,618,119 | A | | 10/1986 | Powell .................... 248/456 |
| 4,765,583 | A | * | 8/1988 | Tenner .................... 248/444 |
| 5,040,757 | A | * | 8/1991 | Benaway ................ 248/118.3 |
| 5,135,190 | A | | 8/1992 | Wilson ................... 248/118.1 |
| 5,143,341 | A | * | 9/1992 | Juster ..................... 248/444 |
| 5,145,270 | A | * | 9/1992 | Darden ................... 400/488 |
| 5,170,971 | A | | 12/1992 | Schaeffer et al. ....... 248/118.1 |
| 5,176,274 | A | * | 1/1993 | Jenkins ................... 220/17.1 |
| 5,195,705 | A | * | 3/1993 | Kline et al. ............ 248/118.3 |
| 5,209,452 | A | * | 5/1993 | Goldberg ................ 248/676 |
| D338,568 | S | * | 8/1993 | Juster ..................... D6/406.4 |
| 5,242,139 | A | * | 9/1993 | Aldrich ................... 248/118 |
| 5,244,296 | A | * | 9/1993 | Jensen .................... 400/715 |
| 5,263,423 | A | * | 11/1993 | Anderson ................ 108/43 |
| 5,292,097 | A | | 3/1994 | Russell ................... 248/281.1 |
| D347,422 | S | * | 5/1994 | Taslitz ..................... D14/461 |
| 5,355,811 | A | * | 10/1994 | Brewer .................... 108/43 |
| 5,375,800 | A | | 12/1994 | Wilcox et al. ......... 248/118.1 |
| 5,464,292 | A | | 11/1995 | Grant ...................... 400/715 |
| 5,492,291 | A | | 2/1996 | Otani ...................... 248/118.1 |
| 5,492,298 | A | * | 2/1996 | Walker .................... 248/346.01 |
| 5,513,824 | A | * | 5/1996 | Leavitt et al. .......... 248/118.3 |
| D372,903 | S | * | 8/1996 | Juster ..................... D14/459 |
| 5,567,067 | A | | 10/1996 | Ambrose ................. 400/472 |
| 5,582,375 | A | | 12/1996 | Martin .................... 248/118.3 |

(Continued)

FOREIGN PATENT DOCUMENTS

WO    WO 98/23185    6/1998

*Primary Examiner*—Anita M. King
(74) *Attorney, Agent, or Firm*—Sheridan Ross P.C.

(57) ABSTRACT

A keyboard support device provides a user with ergonomic positioning of the hands during keyboarding to prevent ailments such as carpal tunnel syndrome. The support device provides surfaces to receive a keyboard and mouse. Wedge shaped inserts can be used to alter the particular angle of the keyboard and mouse thereby providing a user with flexibility to position the hands at a desired angle. A first embodiment can be constructed of a closed cell foam in a molding or injection molding process. A second embodiment provides an inflatable support device especially suited for users who travel.

19 Claims, 4 Drawing Sheets

U.S. PATENT DOCUMENTS

| | | | |
|---|---|---|---|
| 5,593,128 A * | 1/1997 | Odom et al. | 248/346.01 |
| 5,628,483 A | 5/1997 | Smith et al. | 248/118 |
| D391,941 S | 3/1998 | Brunner | D14/114 |
| 5,725,189 A * | 3/1998 | Landy | 248/205.2 |
| 5,730,711 A * | 3/1998 | Kendall et al. | 602/64 |
| 5,732,910 A * | 3/1998 | Martin | 248/118 |
| 5,775,657 A | 7/1998 | Hung | 248/289.11 |
| 5,826,992 A | 10/1998 | Camacho et al. | 400/489 |
| 5,833,378 A | 11/1998 | Gibson | 400/472 |
| 5,881,984 A | 3/1999 | Lin | 248/284.1 |
| 5,937,765 A * | 8/1999 | Stirling | 108/43 |
| D414,166 S * | 9/1999 | De Paris | D14/447 |
| 6,003,446 A * | 12/1999 | Leibowitz | 108/43 |
| 6,216,988 B1 * | 4/2001 | Hsu et al. | 248/118 |
| 6,264,149 B1 * | 7/2001 | Bohman | 248/118 |
| 6,305,652 B1 * | 10/2001 | Borke et al. | 248/174 |
| 6,496,360 B1 * | 12/2002 | Cordes et al. | 361/683 |
| 6,543,949 B1 | 4/2003 | Ritchey et al. | 400/691 |
| 6,745,986 B1 * | 6/2004 | Bright | 248/346.01 |

* cited by examiner

KEYBOARD SUPPORT DEVICE AND METHOD

TECHNICAL FIELD

This invention relates to a keyboard support device, and more particularly, to a support device for supporting a keyboard or keypad at a reverse inclination to help prevent afflictions such as carpal tunnel syndrome experienced by keyboard users.

BACKGROUND OF THE INVENTION

Alphanumeric keyboards used in typewriters, computers, and in certain scientific instruments are most often arranged such that the front edge of the keyboard surface is lower than the rear edge of the keyboard surface. Accordingly, a keyboard operator must elevate the hands with respect to the forearms in order to strike the keys. The medical community has become aware of an affliction known as "carpal tunnel syndrome" which effects the median nerve extending down the arm and out to the hand. This median nerve can be exacerbated by repetitive keyboard operation wherein the hands are elevated in comparison to the forearms.

In order to overcome this undesirable affliction, it is known to provide a keyboard support at a reverse angle or inclination such that the hand and fingers are allowed to droop normally at a level parallel with or somewhat below the forearms. Performing keyboard operations while the hands are in this position can help to prevent carpal tunnel syndrome. One example of a prior art reference which discloses such a reverse angled keyboard support apparatus includes U.S. Pat. No. 5,567,067. This invention discloses a keyboard positioning system in which the keyboard is positioned with its rear edge substantially lower than its forward or operator edge in order that the operator uses the keyboard with the plane of the operator's hands parallel to, or below the line of the operator's forearm, this reducing the incidence of carpal tunnel syndrome. A hand support bar is provided to support the operator's hands while keyboarding.

Another example of a keyboard support device utilizing a reverse inclination is that shown in U.S. Pat. No. 5,833,378. This reference discloses a keyboard support tray having folding legs. The legs have risers to enable adjustment of a support deck to a height so that a hinged tray depends at an approximate negative angle of 25°. The support deck has a height to support a wrist pad at just below the user's wrists to enable typing with a 0° angle from the wrist to the forearm.

Our earlier U.S. Pat. No. 6,543,949 discloses a keyboard support apparatus to help prevent afflictions such as carpal tunnel syndrome. The structure of this apparatus is characterized by a foldable support having a base panel, an incline panel, and means for adjusting the incline of the incline panel with respect to the base panel. The inclined panel is rotatably connected to the base panel, and a user may selectively adjust the inclination of the incline panel to best support the user's arms and wrists thereby placing the hands in a more natural position.

While each of the aforementioned inventions may help to overcome carpal tunnel syndrome or other afflictions, there is still a need for a support apparatus that is of simple construction, and allows a user to adjust the angle at which the hands are positioned for keyboarding operations to optimize a natural position to prevent such afflictions.

SUMMARY OF THE INVENTION

The present invention is a keyboard support device that places the keyboard at a desired reverse angle or inclination such that a user's hands are kept parallel with the forearms or can be bent at a slight downward angle to prevent afflictions such as carpal tunnel syndrome.

According to one object of the invention, a keyboard support device is provided that is of simple yet durable construction. Another object of the invention is to provide a support device that may be adjustable with respect to the angle at which the keyboard is positioned thereby allowing a user to choose the most optimal position for keyboarding. Another object of the invention is to provide a keyboard support device that is easily transportable. Yet another object is to provide a device that is of unitary construction thereby simplifying use of the invention. The unitary construction is preferably achieved by constructing the device from a molding process.

In accordance with these objects, the present invention in a first embodiment is a molded, single piece or unitary support device including a base or platform, an inclined surface that extends from the platform and serves as an elevated support for the forearms and wrists of a user, and a keyboard surface and mouse surface that accommodates a desired inclined positioning of a keyboard and mouse.

The device may be molded from closed cell polyurethane foam, or other thermoplastics or polymers. Ideally, the support device should be lightweight, flexible, yet resilient to support a user's forearms and wrists, as well as to support a keyboard and mouse, or a laptop computer. Thus, the device will return to its undeformed shape after the user releases contact with the device.

The first embodiment may be constructed from well known molding or injection molding techniques. Depending upon the materials used, the device may be constructed of more rigid material such as polyurethane, or may be made of more flexible material such as closed cell foam.

The term "keyboard" as used throughout shall also be understood to include a laptop computer having an integral keyboard, or any other device having a keyboard or keypad such as a PDA.

Wedge shaped inserts may be used to adjust the inclination of the keyboard and mouse thereby providing a user with the ability to best configure the device to match the user's particular anatomy. For some users, it may be desirable to position the keyboard at a greater angle with respect to the users hands. In such a case, the user may utilize one or more of the wedge shaped inserts to place the keyboard at the desired angle.

In a second embodiment of the invention, a keyboard support device is provided that is inflatable for use. Accordingly, the device may be made of a plastic or polymer such as vinyl. Prior to use, the user would inflate the support apparatus. The particular shape and size of the apparatus of the second embodiment would be very similar to that of the device of the first embodiment. The rigidity of the second embodiment could be adjusted by varying the degree to which the device is inflated. If the user desired to adjust the position of the keyboard or mouse, a user could also utilize wedge shaped inserts.

The particular details of the structure of the embodiments, along with other advantages of the invention, will become apparent to one skilled in the art in a review of the following description of the invention, taken in conjunction with the drawings and the claims.

DETAILED DESCRIPTION

Figure 1:
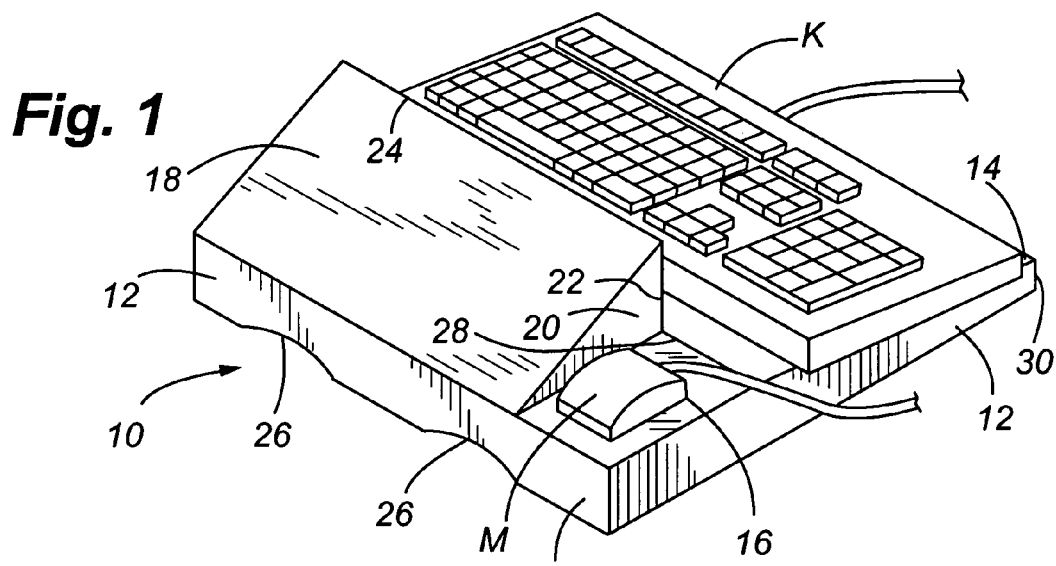
FIG. 1 is a perspective view of a first embodiment of the keyboard support device of the invention.

FIG. 1 illustrates the keyboard support device of the present invention. The device 10 includes a base or platform 12 having a length and width that may accommodate a keyboard K as well as a mouse M. Platform 12 also is sized to accommodate an elevated support 18 that is used to support a user's forearms and/or wrists. The platform 12 further includes a keyboard surface 14 that receives a keyboard K thereon, and a mouse surface 16 that receives a mouse M. The elevated support 18 extends above the level of the keyboard surface 14. One way in which to create the elevated support 18 is simply to provide a raised portion having a triangular shaped cross-section, shown by triangular side edge 20. The support 18 is also defined by a rear edge 22, and an upper edge 24. Preferably, rear edge 22 is arranged perpendicular with respect to the keyboard surface 14 thereby minimizing the required size of the support 18.

The platform 12 has a desired thickness to accommodate the manner in which the device is to be used. One common use for the device would be simply to place it on a flat surface, such as a desk, where the keyboard may normally be found. In this use, the thickness of the platform 12 may be minimized. Furthermore, the underside or bottom surface 25 may have a nonslip surface or layer (not shown) secured or sprayed thereto. However, it has been found that constructing the device from a closed cell foam typically provides enough frictional resistance so that the device will not slide, even on surfaces such as glass. Therefore, providing an additional nonslip surface to cover bottom surface 25 is optional.

If the keyboard is to be used on the user's lap, the thickness of the platform 12 can be increased to accommodate the particular height which optimizes user comfort. In this regard, the user could also simply stack another object underneath the device 10 if the user wished to raise the level of the keyboard. For example, a pillow or other object can be placed under the device 10.

The device 10 may incorporate a pair of channels defined by curved surfaces 26. These channels are spaced and sized to accommodate the thighs of a user, thereby enhancing the stability of the device when placed on the user's lap. These channels may be especially adapted to provide curved surfaces which best match the lap of the user by increasing or decreasing the size of the channels as well as changing the particular curvature of the channels.

Figure 2:
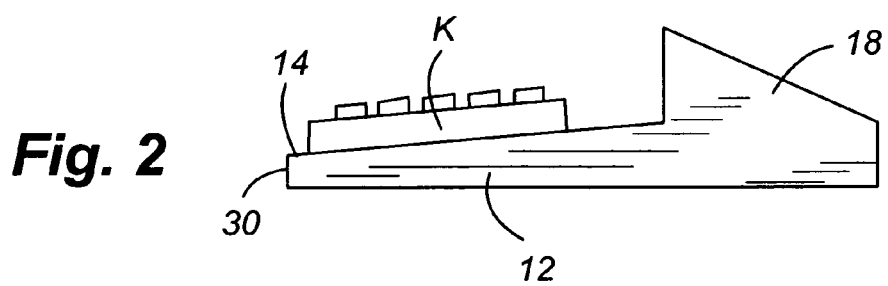
FIG. 2 is a side elevation view of the first embodiment.

FIG. 2 is a side elevation illustrating the particular relationship of the support 18 with respect to the keyboard K as it rests on the keyboard surface 14. The keyboard surface 14 is inclined at a downward or reverse angle in comparison to the support 18. This arrangement therefore allows proper rotation of the user's wrists in a downward direction. The particular inclination or angle of the keyboard surface 14 may also be altered to accommodate a user's particular needs.

Figure 3:
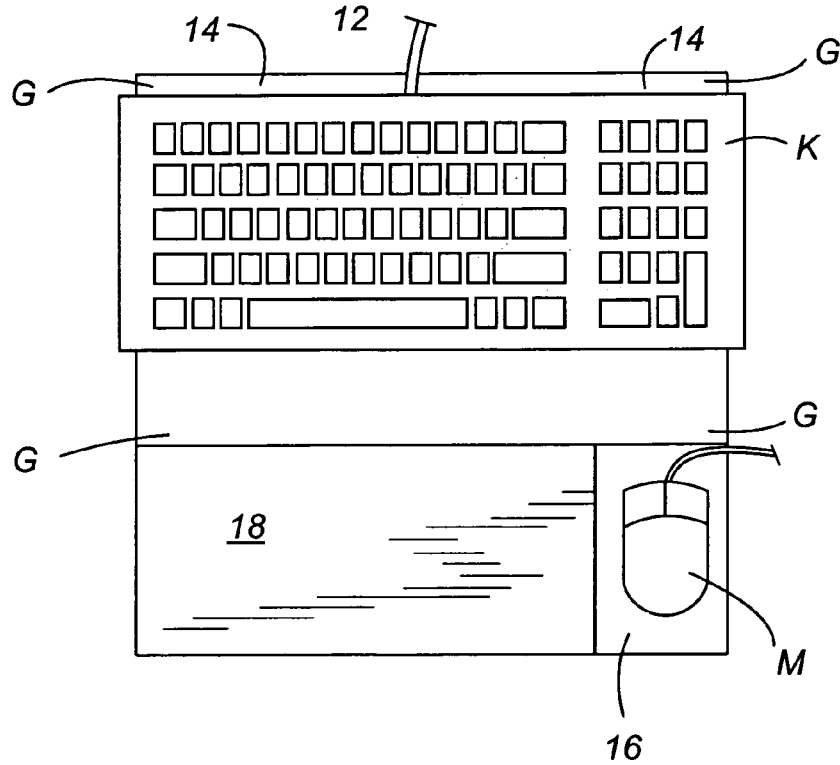
FIG. 3 is a top plan view of the first embodiment.

FIG. 3 illustrates a plan view of the invention showing that there can be some space or gap G on both sides of the keyboard K thereby providing the user some options in placing the keyboard at the desired distance from the upper edge 24 of the support 18. The width of the device 10 is also shown as being slightly less than the width of the keyboard K. However, it shall be understood that the width of the device 10 can be modified to correspond to the particular keyboard K used.

Figure 4:
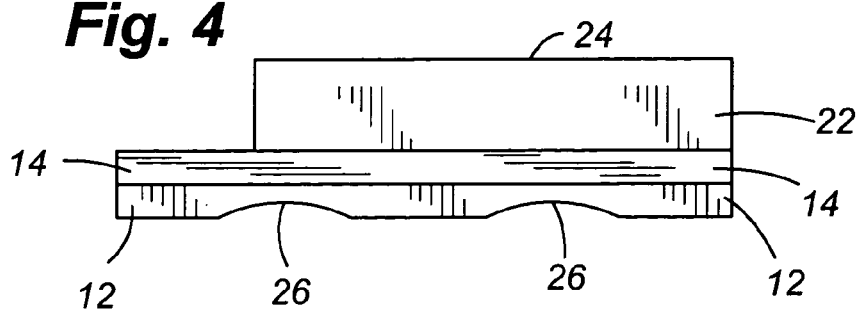
FIG. 4 is a rear side elevation view of the first embodiment.

FIG. 4 simply illustrates a rear elevation of the device and particularly showing the channels formed to receive a user's thighs.

Figure 5:
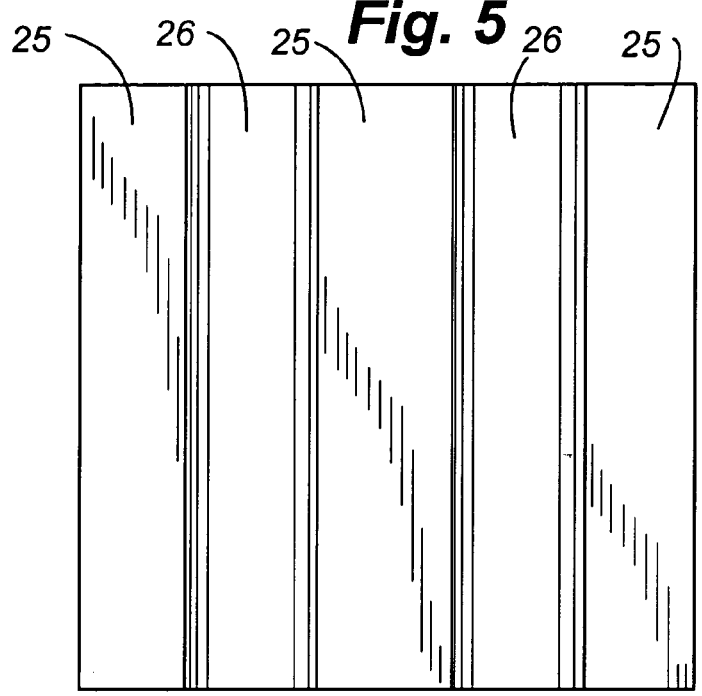
FIG. 5 is a bottom plan view of the first embodiment.

FIG. 5 is a bottom plan view illustrating that the channels may extend the entire length of the device thereby enabling a user to place the device in close proximity to the user's torso or waist and allowing the knees of the person to extend beyond the rear edge 30 of the platform.

Figure 6:
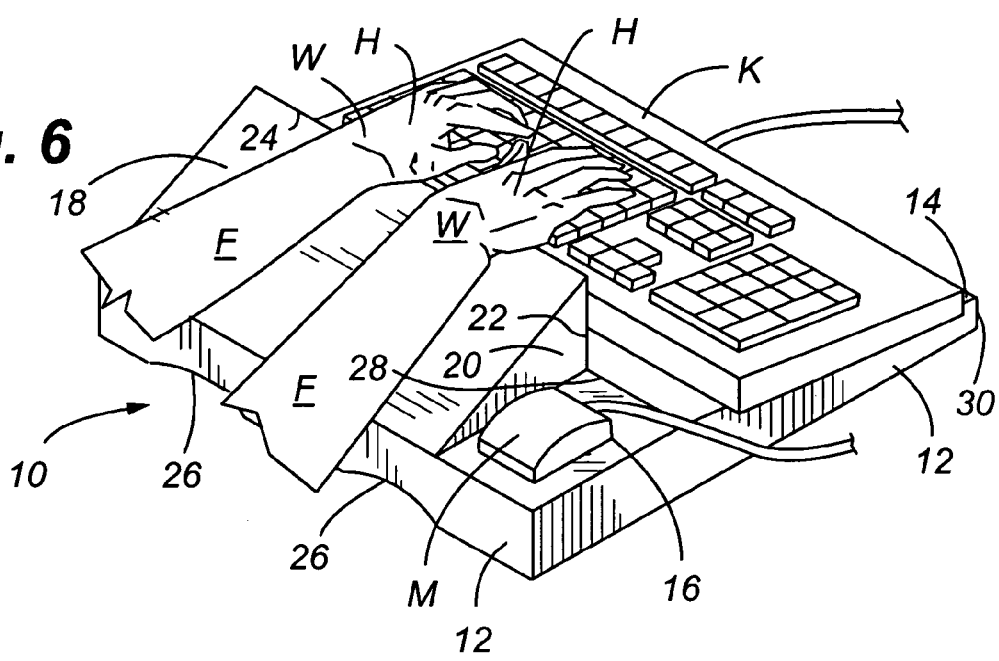
FIG. 6 is a perspective view like FIG. 1, but further illustrating the manner in which a user's forearms and hands may be positioned on the device.

FIG. 6 illustrates the device 10 in use wherein the wrists of the user are placed near the upper edge 24 of the support 18. According to the position shown in FIG. 6, a user can help avoid such conditions as carpal tunnel syndrome because the hands H do not have to be maintained at an elevated position with respect to the forearms F, and some rotation of the wrists are allowed thereby placing the hands in a more natural position. The device can be made of foam or another resilient type of material. Thus, the support 18 also acts as a pad to provide a comfortable support for the user. Depending upon the type of material used, there will be some compression along the edge 24 as the weight of the user's hands and forearms are placed on the device.

Figure 7:
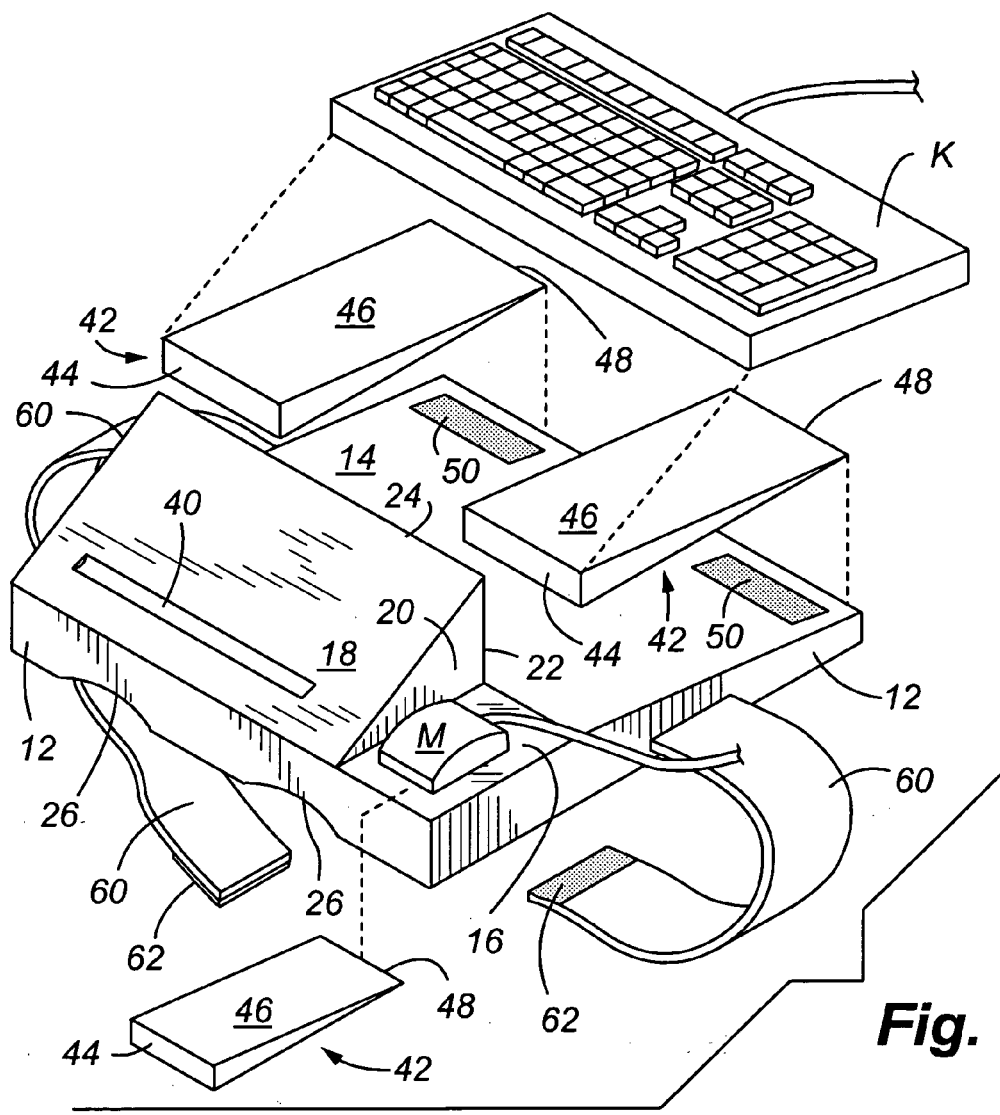
FIG. 7 is another perspective view of the first embodiment and further illustrating various features which may be added to the first embodiment to include wedge shaped inserts and securing straps.

FIG. 7 illustrates additional features of the first embodiment to include an optional slot 40 that may be formed on the support 18 as a means to conveniently store objects such as pens or pencils. Additionally, FIG. 7 illustrates a plurality of wedge shaped inserts 42 that may be used to adjust the particular inclination of the keyboard K or the mouse M. As shown, the wedged shaped inserts 42 have an inclined surface 46 with one end bounded by vertical edge 44, and the other end terminating at tapered edge 48. The particular height of edge 44 may be modified to provide the user with the amount of additional inclination required to place the keyboard and mouse in the desired orientation. As shown, to support the keyboard at a different angle than simply placing the keyboard on the surface 14, a pair of inserts 42 may be placed on the keyboard surface 14. In order to better secure the inserts 42, a means for securing 50 may be provided such as an adhesive material or hook and pile material placed on the keyboard surface and/or on the bottom surface of the inserts. The inserts 42 may also be stacked on one another to increase the inclination of the keyboard and mouse.

It may desirable to secure the platform 12 to the user's legs. Accordingly, a pair of securing straps 60 may be provided with some attachment means 62 such as hook and pile material thereby holding the straps in place. Thus, the user has some ability to shift or move their body in the seated position, and such movement will not necessarily cause the platform 12 to fall off the user's lap.

Figure 8:
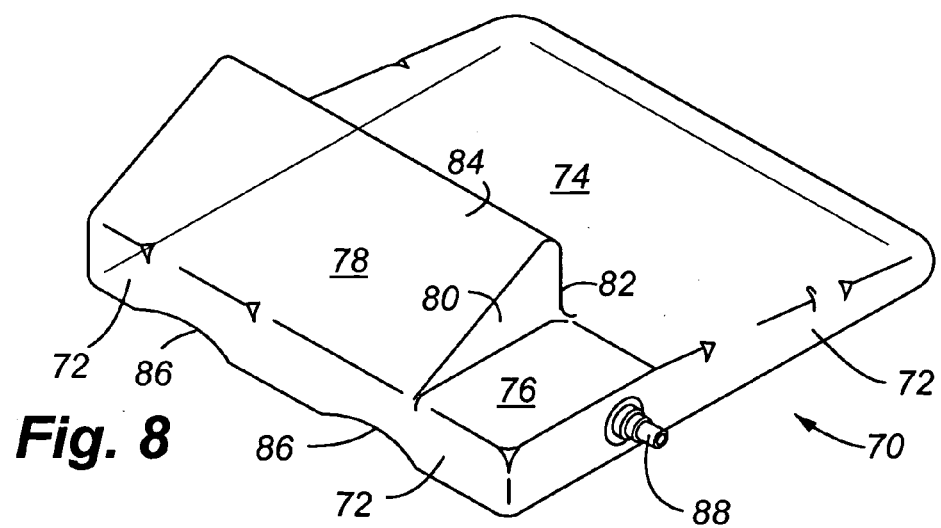
FIG. 8 is a perspective view of a second embodiment of the present invention.

FIG. 8 illustrates a second embodiment of the present invention in which a keyboard support device 70 can be inflated for use. Accordingly, the device 70 may be made from a flexible vinyl, or other inflatable polymer or plastic material. Like the first embodiment, the device 70 of the second embodiment includes a platform 72, a keyboard surface 74, a mouse surface 76, and an elevated support 78. The elevated support 78 can be arranged by creating a raised portion having a triangular cross section, as shown by triangular side edge 80. The elevated support 78 like the first embodiment also has a rear edge 82 and an upper edge 84. The device 70 may also include curved surfaces 86 that define channels to receive the thighs of the user. An inflation port 88 can be located along the side edge of the platform 12 allowing the user to inflate and deflate the device. The device 70 can be assembled from a number of die cut pieces of material that are joined to one another, for example by sonic welding. When the device is not in use, the operator can simply deflate the device and fold it for storage. Therefore, the device 70 is particularly adapted for a user to carry for traveling.

Figure 9:
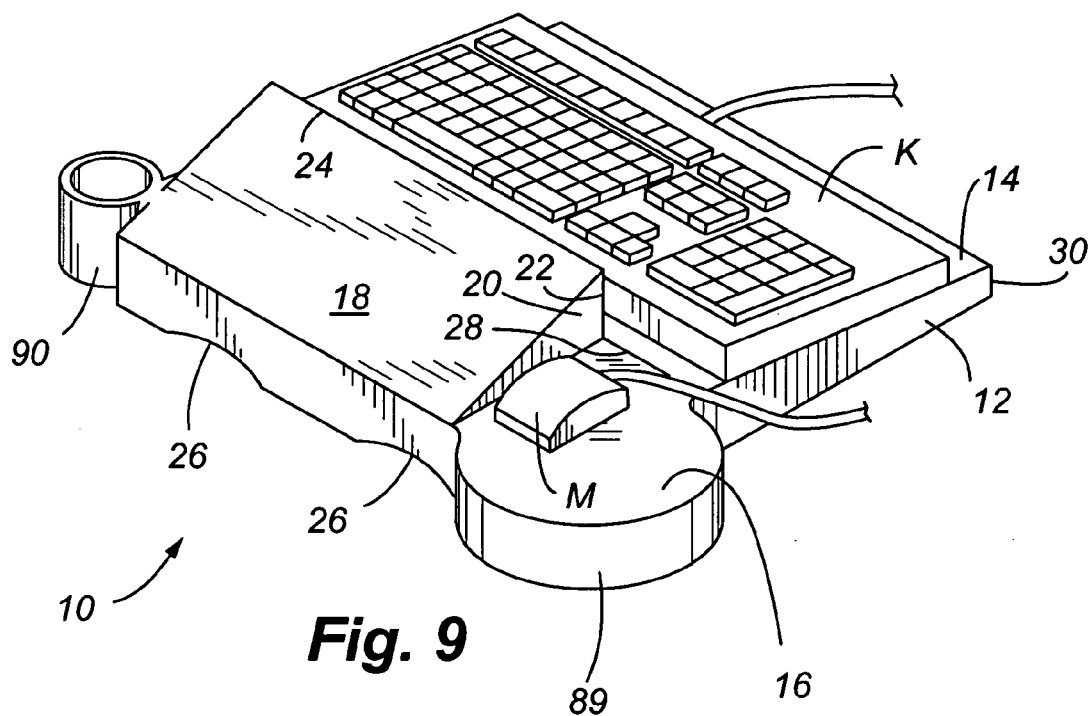
FIG. 9 is a perspective view of yet another embodiment of the present invention.

The mouse surface 16 is shown as being substantially rectangular in FIGS. 1–8. However, it may also be desirable to provide a greater surface area for the mouse surface 16 by enlarging the portion of the platform 12 at the mouse surface. Referring to FIG. 9, an overhang or flange 89 can be provided which would enlarge the size of the mouse surface 16 both in length and width. Accordingly, the platform 12 would have an irregular shape by incorporation of the overhang or flange. Because the device can be molded, a number of other features can be easily incorporated within the unitary construction, such as a cup holder 90.

In accordance with a method of the present invention, a method is provided for reducing physical discomfort for a keyboard user. The method allows a keyboard user to adjust the keyboard support device so that the keyboard is placed at the desired reverse angle or inclination thereby enabling the user to rotate the wrists so the hands can be placed at a desired angle with respect to the user's forearms. Thus, the method includes providing the keyboard support device, positioning the keyboard support device in front of the user, placing a keyboard on the keyboard support device, adjusting the keyboard support device by optionally inserting one or more wedge inserts between the keyboard and the keyboard surface of the device, placing the user's wrists and/or forearms on an elevated support of the device, and using the keyboard in the selected inclined position. If the user desires to place the support device on the user's lap, then a user may wish to use the securing straps.

By the foregoing, a keyboard support device is provided that is very simple in construction, yet is effective in providing a user a means to place the hands in a more ergonomic position during keyboarding. The device of both embodiments is lightweight, and easily stored.

The device can be manufactured from known molding techniques and is therefore cost effective. The device is simple to use and is durable because it has no moving parts due to its unitary construction.

This invention has been described in detail with reference to particular embodiments thereof, but it will be understood that various other modifications can be made within the spirit and scope of the invention as claimed.

What is claimed is:

1. A keyboard support device comprising:
a base;
an elevated support extending from said base, and having a height extending above the base;
said base having an inclined keyboard surface extending at a reverse-incline with respect to said elevated support wherein the keyboard surface extends downward and away from the elevated support;
a mouse surface positioned substantially co-planar with the base and below the elevated support;
a pair of channels formed on a bottom surface of said base, said channels extending substantially parallel to one another and especially adapted for receiving thighs of a user;
and wherein said device is made of a single material in a unitary molded construction.

2. A device, as claimed in claim 1, further including:
at least one wedge insert placed on said keyboard surface to selectively adjust an angle at which a keyboard resides when a keyboard is placed on said keyboard surface.

3. A device, as claimed in claim 1, wherein:
said elevated support has a triangular cross-section shape.

4. A device, as claimed in claim 1, wherein:
said support device is made from the material selected from the group consisting of polyurethane, thermoplastics, and vinyl.

5. A device, as claimed in claim 1, wherein:
said device is made from the material that is resilient so that at least said elevated support can resiliently support wrists and forearms of a user wherein the support returns to an undeformed shape after the user releases from contact with the device.

6. A device, as claimed in claim 1, wherein:
said keyboard support device is non-adjustable and maintains a stationary configuration.

7. A device, as claimed in claim 1, further including:
at least one securing strap attached to said base for securing legs or a user.

8. A keyboard support device comprising:
a base;
means for supporting forearms and wrists of a user, said means for supporting extending from said base and extending above the base;
said base having an inclined keyboard surface extending at a reverse-incline with respect to said means for supporting, wherein the keyboard surface extends downward and away from said means for supporting;
a pair of channels formed on a bottom surface of said base, said channels extending substantially parallel to one another and especially adapted for receiving thighs of a user; and
wherein said device is made of a single material in a unitary molded construction.

9. A device, as claimed in claim 8, further including:
a mouse surface positioned adjacent said means for supporting and said keyboard surface.

10. A device, as claimed in claim 8, further including:
at least one wedge insert placed on said keyboard surface to selectively adjust an angle at which a keyboard resides when a keyboard is placed on said keyboard surface.

11. A device, as claimed in claim 8, wherein:
said means for supporting has a triangular cross-section shape.

12. A device, as claimed in claim 8, wherein:
said support device is made from a material selected from the group consisting of polyurethane, thermoplastics, and vinyl.

13. A device, as claimed in claim 8, wherein:
said device is made from a material that is resilient so that at least said means for supporting can resiliently support wrists and forearms of a user wherein the support returns to an undeformed shape after the user releases from contact with the device.

14. A device, as claimed in claim 8, wherein:
said keyboard support device is non-adjustable and maintains a stationary configuration.

15. A device, as claimed in claim 8, further including:
at least one securing strap attached to said base for securing legs or a user.

16. A method of reducing physical discomfort for a keyboard user, said method comprising the steps of:
providing a keyboard support device having a base, an elevated support extending from said base and having a height extending above a keyboard mounted on the support device, said base having an inclined keyboard surface extending downward and away from the elevated support, and wherein said device is of a unitary molded construction;
positioning the keyboard device in front of the user;
placing the keyboard on the keyboard support device;
placing a user's wrists or forearms on the elevated support;
using the keyboard in an inclined position corresponding to the inclined keyboard surface on which the keyboard rests;
maintaining a non-adjustable position for the inclined keyboard surface; and
placing the keyboard support device on a lap of a user; and
securing the keyboard support device to the user by at least one strap attached to the support device.

17. A method, as claimed in claim 16, further including the step of:
providing at least one wedge support; and
inserting said wedge insert between said keyboard and said inclined keyboard surface thereby adjusting an angle from horizontal at which said keyboard rests on said keyboard surface.

18. A method, as claimed in claim 16, further including the steps of:
providing a mouse surface integral with said support device;
placing a mouse on said keyboard surface; and
using the mouse.

19. A method, as claimed in claim 18, further including the steps of:
providing at least one wedge support; and
inserting said wedge support between said mouse and said mouse surface thereby adjusting an angle from horizontal at which said mouse rests on said mouse surface.

* * * * *